(12) United States Patent
Yu et al.

(10) Patent No.: US 10,754,918 B2
(45) Date of Patent: Aug. 25, 2020

(54) SYSTEM FOR PROVIDING REMOTE BUILDING EFFICIENCY AUDITS

(71) Applicant: OPOWER, INC., Arlington, VA (US)

(72) Inventors: Suelyn Yu, San Francisco, CA (US); Garner Chung, Oakland, CA (US); Benjamin Packer, Palo Alto, CA (US); Erik Shilts, San Francisco, CA (US)

(73) Assignee: OPower, Inc., Redwood Shores, CA (US)

( * ) Notice: Subject to any disclaimer, the term of this patent is extended or adjusted under 35 U.S.C. 154(b) by 667 days.

(21) Appl. No.: 15/051,548

(22) Filed: Feb. 23, 2016

(65) Prior Publication Data

US 2017/0242938 A1 Aug. 24, 2017

(51) Int. Cl.
| | | |
|---|---|---|
| *G06F 17/10* | (2006.01) | |
| *G06Q 10/00* | (2012.01) | |
| *G05B 15/02* | (2006.01) | |
| *G05B 17/02* | (2006.01) | |

(52) U.S. Cl.
CPC ............ *G06F 17/10* (2013.01); *G05B 15/02* (2013.01); *G06Q 10/00* (2013.01); *G05B 17/02* (2013.01)

(58) Field of Classification Search
CPC .......... G06F 17/10; G05B 15/02; G06Q 10/00
USPC .......................................................... 703/2
See application file for complete search history.

(56) References Cited

U.S. PATENT DOCUMENTS

| | | | |
|---|---|---|---|
| 4,653,507 A | 3/1987 | Laudadio | |
| 2004/0206405 A1* | 10/2004 | Smith | E03B 7/071 |
| | | | 137/624.12 |
| 2010/0324962 A1 | 12/2010 | Nesler | |
| 2012/0150361 A1* | 6/2012 | Lazaris | H02J 3/382 |
| | | | 700/297 |
| 2013/0151179 A1 | 6/2013 | Gray | |
| 2015/0276495 A1* | 10/2015 | Smullin | G01K 3/04 |
| | | | 702/130 |
| 2015/0310465 A1* | 10/2015 | Chan | G06Q 30/0205 |
| | | | 705/7.34 |
| 2016/0364646 A1 | 12/2016 | Fischer | |
| 2017/0038279 A1 | 2/2017 | Dasgupta et al. | |

(Continued)

OTHER PUBLICATIONS

US Patent and Trademark Non-Final Office Action in Co-pending U.S. Appl. No. 15/051,566, filed Feb. 23, 2016, notification date of May 3, 2018.

(Continued)

*Primary Examiner* — Saif A Alhija
(74) *Attorney, Agent, or Firm* — Kraguljac Law Group, LLC

(57) ABSTRACT

The subject disclosure relates to systems and methods for calculating a thermal sensitivity score. In some aspects, the method includes steps for receiving temperature information for a first geographic location, receiving resource consumption data for each of a plurality of similar consumption locations in the first geographic location, and generating, by the processors, a thermal sensitivity model based on the temperature information and the resource consumption data for each of the plurality of similar consumption locations. In some aspects, the steps can further include computing a thermal sensitivity score for each of the similar consumption locations using the thermal sensitivity model. Systems and machine readable media are also provided.

16 Claims, 8 Drawing Sheets

(56) References Cited

U.S. PATENT DOCUMENTS

2017/0148114 A1    5/2017  Liptsey-rahe
2017/0242938 A1    8/2017  Yu
2017/0242939 A1    8/2017  Yu et al.
2017/0242940 A1    8/2017  Yu

OTHER PUBLICATIONS

US Patent and Trademark Non-Final Office Action in Co-pending U.S. Appl. No. 115051573, filed Feb. 23, 2016, notification date of Aug. 15, 2018.
Wang et al., Commercial Building Energy Asset Score System: Program Overfview and Technical Protocol (Version 1.0). No. PNNL-22045. Pacific Northwest National Lab. (PNNL), Richland, WA (United States), 2013.
Granderson, et al., "Building Energy Information Systems: User Case Studies." Energy Efficiency 4.1(2011): 17-30.
US Patent and Trademark Non-Final Office Action in U.S. Appl. No. 15/051,573, filed Feb. 23, 2016, having a notification date of Feb. 24, 2020.
US Patent and Trademark Final Office Action in co-pending U.S. Appl. No. 15/051,573, filed Feb. 23, 2016, notification date Mar. 21, 2019.

* cited by examiner

SYSTEM FOR PROVIDING REMOTE BUILDING EFFICIENCY AUDITS

BACKGROUND

1. Technical Field

The subject technology provides improvements in technical fields including the field of building energy/efficiency measurement instrumentation and auditing technology. Aspects of the technology relate to systems and methods for evaluating energy efficiency at a resource consumption location, such as a residence or business establishment. In particular, aspects of the technology enable remote efficiency audits based on an analysis of various information types, such as, electric energy consumption data and weather data.

2. Introduction

As the demand for electricity increases worldwide, meeting the demand has become more expensive. One way to meet energy demands is to improve energy efficiency, the importance of which has become increasingly important. Efforts to reduce electricity consumption have motivated advances in efficient energy use and conservation efforts, such as improvements in building efficiency.

On-site building efficiency audits can be useful in determining the energy efficiency of a location where an energy resource (e.g., electric power and/or gas) is used, such as a residential or commercial building. Although on-site audits can be helpful for identifying sources of energy leaks (such as thermal leaks), on-site audits are often costly and inconvenient, requiring the use of specialized instrumentation, and visitation by a trained auditor.

During an on-site efficiency audit, an auditor may utilize a number of tools. Such tools can include, but are not limited to: telescoping ladders, screwdrivers, pliers and/or adjustable wrenches, tape measures, flashlights, a smoke generating device, and/or inspection mirrors, etc. An array of instruments may also be used for an on-site audit. Some such instruments can include, but are not limited to: infrared cameras, combustion analyzer/s, manometers, watt meters, moisture meters, draft gauges, and/or digital probe thermometers, etc. Due to the extensive use of tools and instruments that can be required to perform effective on-site efficiency audits, on-site audits can be both difficult to schedule and expensive to perform.

The subject technology addresses the forgoing technical limitations of on-site efficiency audits by providing systems and methods for remotely evaluating the energy efficiency of a resource consumption site (a building), such as a utility subscriber's home or a business location where energy is used. Aspects of the technology involve the collection of energy resource consumption data in conjunction with other data and/or signals, such as weather information, indoor climate information, thermostat set points, and/or various user behaviors. As explained in further detail below, these signals can be used to calculate energy efficiency scores or ratings for a respective location. Because different types of weather changes can have differing effects on a building's indoor climate, in some aspects, an analysis of indoor climate (e.g., temperatures or balance points), can help identify and recommend user actions that can increase building efficiency.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In certain aspects, the disclosed subject matter relates to a computer-implemented method for computing a thermal sensitivity score for a resource consumption location. In some aspects, the method includes steps for receiving, by one or more processors, temperature information for a first geographic location over a first time period, receiving, by the processors, resource consumption data for each of a plurality of similar consumption locations in the first geographic location over the first time period, and generating, by the processors, a thermal sensitivity model based on the temperature information and the resource consumption data for each of the plurality of similar consumption locations. In some aspects, the method further includes steps for computing, by the processors, a thermal sensitivity score for each of the similar consumption locations using the thermal sensitivity model, wherein each of the thermal sensitivity scores indicates a relative energy use sensitivity for a corresponding consumption location relative to temperature fluctuations in the first geographic location.

In another aspect, the disclosed subject matter relates to a system for computing a thermal sensitivity score, the system including: one or more processors, and a computer-readable medium including instructions stored therein, which when executed by the processors, cause the processors to perform operations including: receiving, by one or more processors, temperature information for a first geographic location over a first time period, receiving, by the processors, electric energy consumption data for each of a plurality of similar consumption locations in the first geographic location over the first time period, and generating, by the processors, a thermal sensitivity model based on the temperature information and the electric energy consumption data for each of the plurality of similar consumption locations. In some aspects, the operations can further include computing, by the processors, a thermal sensitivity score for each of the similar consumption locations using the thermal sensitivity model, wherein each of the thermal sensitivity scores indicate relative energy use sensitivity for a corresponding consumption location relative to temperature fluctuations in the first geographic location.

In another aspect, the subject technology relates to a non-transitory computer-readable storage medium including instructions stored therein, which when executed by one or more processors, cause the processors to perform operations including: receiving, by one or more processors, temperature information for a first geographic location over a first time period, receiving, by the processors, resource consumption data for each of a plurality of similar consumption locations in the first geographic location over the first time period, and generating, by the processors, a thermal sensitivity model based on the temperature information and the resource consumption data for each of the plurality of similar consumption locations. In some aspects, the instructions may be further configured to cause the processors to perform operations including, computing, by the processors, a thermal sensitivity score for each of the similar consumption locations using the thermal sensitivity model, wherein each of the thermal sensitivity scores indicates a relative energy use sensitivity for a corresponding consumption location relative to temperature fluctuations in the first geographic location, identifying a target consumption location, from among the plurality of similar consumption locations, based on the thermal sensitivity score for the target consumption location, and generating a targeted notification for a utility customer associated with the target consumption location, wherein the targeted notification includes one or more energy efficiency tips that are selected based on the thermal sensitivity score associated with the target consumption location.

In another aspect, the disclosed technology relates to a computer-implemented method, including: receiving, by one or more processors, wind speed information for a first geographic location over a first time period, receiving, by the processors, resource consumption data for each of a plurality of similar consumption locations in the first geographic location over the first time period, and generating, by the processors, a wind sensitivity model based on the wind speed information and the resource consumption data for each of the plurality of similar consumption locations. In some aspects, the method further includes steps for computing, by the processors, a wind sensitivity score for each of the similar consumption locations using the wind sensitivity model, wherein each of the wind sensitivity scores indicates a relative energy use sensitivity for a corresponding consumption location relative to wind speed fluctuations in the first geographic location.

In yet another aspect, the subject technology is directed to a wind sensitivity score calculation system including one or more processors, and a memory device storing instructions that, when executed by the one or more processors, causes the wind sensitivity score calculation system to perform operations including: receiving, by the one or more processors, wind speed information for a first geographic location over a first time period, receiving, by the processors, electric energy consumption data for each of a plurality of similar consumption locations in the first geographic location over the first time period, and generating, by the processors, a wind sensitivity model based on the wind speed information and the electric energy consumption data for each of the plurality of similar consumption locations. In some aspects, the processors may be further configured to perform steps including: computing a wind sensitivity score for each of the similar consumption locations using the wind sensitivity model, wherein each of the wind sensitivity scores indicate relative energy use sensitivity for a corresponding consumption location relative to wind speed fluctuations in the first geographic location.

In another aspect, the subject technology relates to a non-transitory computer-readable storage medium including instructions stored therein, which when executed by one or more processors, cause the processors to perform operations including: receiving, by one or more processors, wind speed information for a first geographic location over a first time period, receiving, by the processors, resource consumption data for each of a plurality of similar consumption locations in the first geographic location over the first time period, generating, by the processors, a wind sensitivity model based on the temperature information and the resource consumption data for each of the plurality of similar consumption locations, and computing, by the processors, a wind sensitivity score for each of the similar consumption locations using the wind sensitivity model, wherein each of the wind sensitivity scores indicates a relative energy use sensitivity for a corresponding consumption location relative to temperature fluctuations in the first geographic location. In some aspects, the instructions may be further configured to cause the processors to perform operations including: identifying a target consumption location, from among the plurality of similar consumption locations, based on the wind sensitivity score for the target consumption location, and generating a targeted notification for a utility customer associated with the target consumption location, wherein the targeted notification includes one or more energy efficiency tips that are selected based on the wind sensitivity score associated with the target consumption location.

In another aspect, the disclosure relates to a computer-implemented method, including steps for receiving, by one or more processors, solar exposure information for a first geographic location over a first time period, receiving, by the processors, resource consumption data for each of a plurality of similar consumption locations in the first geographic location over the first time period, and generating, by the processors, a solar sensitivity model based on the solar exposure information and the resource consumption data for each of the plurality of similar consumption locations. In some aspects, the steps can further include computing, by the processors, a solar sensitivity score for each of the similar consumption locations using the solar sensitivity model, wherein each of the solar sensitivity scores indicates a relative energy use sensitivity for a corresponding consumption location relative to sun light intensity fluctuations in the first geographic location.

In another aspect, the subject technology relates to a solar sensitivity score calculation system including one or more processors, and a memory device storing instructions that, when executed by the one or more processors, causes the solar sensitivity score calculation system to perform operations including: receiving, by the one or more processors, solar exposure information for a first geographic location over a first time period, receiving, by the processors, electric energy consumption data for each of a plurality of similar consumption locations in the first geographic location over the first time period, and generating, by the processors, a solar sensitivity model based on the solar exposure information and the electric energy consumption data for each of the plurality of similar consumption locations. In some aspects, the instruction may be further configured to cause the processors to perform steps for computing, by the processors, a solar sensitivity score for each of the similar consumption locations using the solar sensitivity model, wherein each of the solar sensitivity scores indicates a relative energy use sensitivity for a corresponding consumption location relative to sun light intensity fluctuations in the first geographic location.

In yet another aspect, the subject technology relates to a non-transitory computer-readable storage medium including instructions stored therein, which when executed by one or more processors, cause the processors to perform operations including: receiving, by one or more processors, solar exposure information for a first geographic location over a first time period, receiving, by the processors, resource consumption data for each of a plurality of similar consumption locations in the first geographic location over the first time period, and generating, by the processors, a solar sensitivity model based on the temperature information and the resource consumption data for each of the plurality of similar consumption locations. In some aspects, the processors can be configured to perform further operations including: computing a solar sensitivity score for each of the similar consumption locations using the solar sensitivity model, wherein each of the solar sensitivity scores indicates a relative energy use sensitivity for a corresponding consumption location relative to temperature fluctuations in the first geographic location, identifying a target consumption location, from among the plurality of similar consumption locations, based on the solar sensitivity score for the target consumption location, and generating a targeted notification for a utility customer associated with the target consumption location, wherein the targeted notification includes one or more energy efficiency tips that are selected based on the solar sensitivity score associated with the target consumption location.

It is understood that other configurations of the subject technology will become readily apparent to those skilled in the art from the following detailed description, wherein various configurations of the subject technology are shown and described by way of illustration. The subject technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects that, together with the Detailed Description, serve to explain the principles of the subject technology. In the drawings:

DETAILED DESCRIPTION

Figure 1:
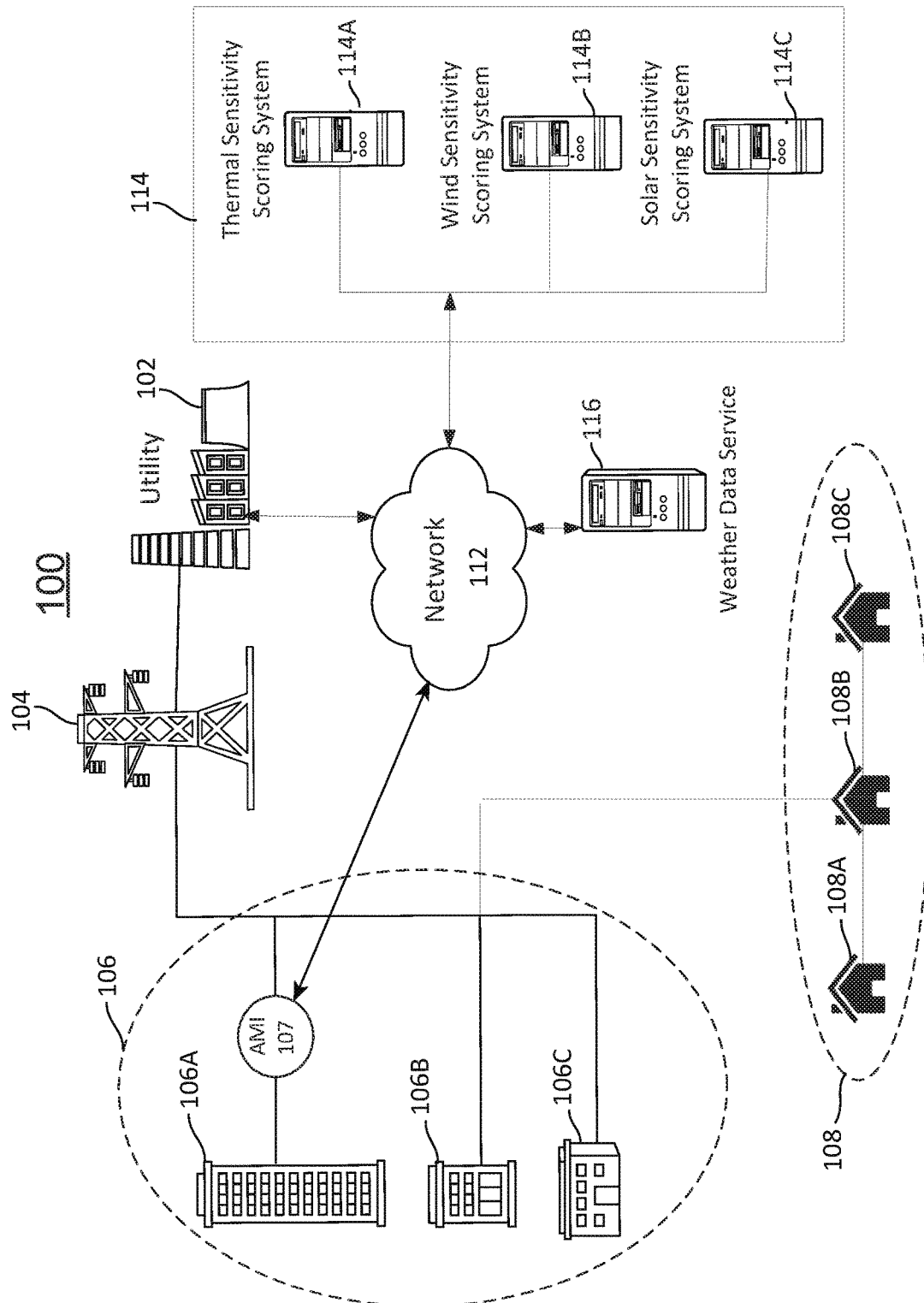
FIG. 1 illustrates an example environment for implementing one or more remote efficiency scoring systems, according to some aspects of the technology.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As used herein the term "model" refers generally to a description or representation of a system. The description or representation can use mathematical language, such as in the case of mathematical models. Examples of types of models and/or characteristics of models, without limitation, can include: lookup tables, linear, non-linear, deterministic, probabilistic, static, dynamic, and models having lumped parameters and/or distributed parameters.

As used herein "sensor" refers generally to a device or system that measures and/or registers a substance, physical phenomenon and/or physical quantity. A sensor may convert a measurement into a signal, which can be interpreted by an observer, instrument and/or system. A sensor can be implemented as a special purpose device and/or can be implemented as software running on a general-purpose computer system. In some aspects, sensors may be used to measure power usage at a resource consumption location. By way of example, an "advanced metering infrastructure" (AMI) device may be utilized for measuring an amount of electrical energy or electrical power. As discussed in further detail below, AMI devices can be configured to perform measurements on various time granularities, e.g., by measuring energy usage on a day-by-day, hour-by-hour or minute-by-minute basis.

A variety of sensors can also be implemented for measuring weather phenomena. By way of example, weather sensors can include, but are not limited to: thermometers (e.g., for measuring temperature), anemometers (e.g., for measuring wind speed and/or direction), barometers (e.g., for measuring atmospheric pressure), hygrometers (e.g., for measuring humidity), pyranometers/actinometers (e.g., for measuring solar irradiance or solar radiation flux density), and/or rain gauges, etc.

It will be appreciated that the systems and methods of the disclosed technology are novel, as are applications thereof and many of the components, systems, methods and algorithms employed and included therein. It should be appreciated that embodiments of the presently described inventive body of work can be implemented in numerous ways, including as processes, apparatus, systems, devices, methods, computer readable media, computational algorithms, embedded or distributed software and/or as a combination thereof. Several illustrative embodiments are described below.

The disclosed technology relates to methods and systems for performing remote efficiency audits and in particular, for calculating various types of "energy efficiency" scores, indicating a relative measure of a building's energy-use efficiency. As will be described in further detail below, the energy efficiency score may be calculated based on, for example, energy usage data and/or weather data from various sensors. In some aspects, efficiency scores can be used to identify specific insights and provide information or suggestions relating to improvements for increasing a building's efficiency. By way of example, efficiency insights may provide information specific to a particular type of building improvement or update, such as information relating to the improvement of insulation or weather stripping.

In some aspects, the energy efficiency score is determined, based at least in part, on whole building energy use, which can be predominated by energy used for heating or cooling i.e., by heating ventilating or air-conditioning (HVAC) systems. The calculated energy efficiency score provides some quantitative measure of a building's ability to maintain indoor climate conditions, despite outdoor weather changes.

As discussed in further detail below, efficiency scores may also reflect energy demand changes or indoor climate changes with respect to a particular weather change type (e.g., temperature, wind speed, or solar intensity, etc.).

Conventional on-site building efficiency audits are routinely performed to determine the relative energy efficiency for a location where an energy resource (e.g., electric power) is used, such as a residential or commercial building. Although on-site efficiency audits can be helpful for identifying sources of energy leaks (such as thermal leaks), on-site audits are often inconvenient and costly, requiring visitation by a trained auditor, which can include the auditor's need for bringing and deploying specialized instrumentation. In some cases, homeowners or building managers may perform an on-site building efficiency audit, however these audits are time consuming, often require lengthy instructions or training, and still require the auditor to acquire specialized instrumentation.

The subject technology addresses the technical limitations of on-site audits by leveraging a communication network infrastructure and sensor data to provide systems and methods for remotely evaluating the efficiency of a resource consumption site, such as a utility subscriber's home or a business location where energy is consumed. As used herein, "remote" efficiency evaluations can refer to evaluations performed using data collection and/or processing that occur at a geographic location separate from that of the consumption location. However, as discussed in further detail below, the remote efficiency audit implementations disclosed herein do not preclude the use of on-site data collection, such as the use of Advanced Metering Infrastructure (AMI) devices, or locally based weather sensors, etc.

Aspects of the disclosure involve the collection of energy resource consumption data in conjunction with other signals, such as indoor temperature levels, weather conditions and/or user behaviors, to calculate an energy efficiency score or rating for the respective location. Because weather conditions can cause different changes to a building's indoor climate (e.g., buildings react to certain weather conditions differently from one another), in some aspects, an analysis of indoor climate (e.g., temperatures or balance points), can help to determine what actions may be taken to increase building efficiency.

As will be discussed in further detail below, remote efficiency audits can utilize the calculation of heating degree days (HDD) or heating degree hours (HDH), for heating activities. Similarly, the calculation of cooling degree days (CDC) or cooling degree hours (CDH) may be used for cooling activities.

As used herein, heating degree days (HDD) or heading degree hours (HDH) are defined relative to a baseline temperature above which a building needs no heating (or for CDC/CDH, below which a building needs no cooling). In some aspects, the baseline temperature is a base temperature that may be a predetermined temperature that is generally comfortable to humans (e.g., room temperature). For example, the baseline temperature may have a value between 55° F. and 75° F. However, the most appropriate base temperature can vary based on geography (e.g., different for humid and dry climates), the temperature to which the building is heated, and the nature of the building, including heat-generating occupants and equipment.

In some aspects, the base temperature for a calculation of heating degree values (e.g., HDD/HDH) and cooling degree values (e.g., CDC/CDH) is an indoor temperature of about 18° C. or 19° C. (~65° F.) which is typically adequate for human comfort. However, in other embodiments, the base temperature for the cooling degree values and the heating degree values is different. For example, the base temperature for heating degree values may be 60° F. (heating base temperature) and the base temperature for cooling degree values may be 70° F. (cooling base temperature). Such a model assumes that moderate outdoor temperatures between 60° F. and 70° F. would not lead to heating or cooling energy usage.

For calculations relating to a particular building, HDD can be calculated using the most appropriate base temperature for that building, such as a temperature that the occupants consider to be comfortable (e.g., 70° F.). There are a number of ways in which HDD can be calculated, and typically, the more detailed a record of temperature data, the more accurate the HDD that can be calculated. For example, HDD are often calculated using simple approximation methods based on daily temperature readings, however more detailed temperature readings, such as hourly readings, could be used for more precise calculations, e.g., of a HDH score.

One approximation method is to take the average temperature on any given day and subtract it from the base temperature. If the value is less than or equal to zero, that day has zero HDD. However, if the value is positive, that number can represent the number of HDD on that day. It is understood that other HDD (or HDH) algorithms may be used, and which enable results to be computed in temperate climates (maritime as well as continental) at various times during the year, as well as on different time scales, such as on a weekly, monthly, or hourly basis. By way of example, a HDD of 'one' indicates that outside temperature conditions were equivalent to being below a defined threshold comfort temperature inside the building by one degree for one day. Alternatively, a HDH of one indicates that outside temperature conditions were equivalent to being below a defined threshold comfort temperature inside the building by one degree for one hour of a day.

Cooling degree values (CDD/CDH) may be calculated similarly. For example, an appropriate base temperature for a building may be selected and the CDD or CDH value may be calculated by subtracting the base temperature from the average temperature on a particular day or hour (depending on whether a CDD or CDH is being calculated). If the value is less than or equal to zero, that day has zero CDD or CDH. However, if the value is positive, that number can represent the number of CDD on that day or CDH for that hour of the day. A CDD of 'one' indicates that outside temperature conditions were equivalent to being above a defined threshold comfort temperature inside the building by one degree for one day. A CDH of 'one' indicates that outside temperature conditions were equivalent to being above a defined threshold comfort temperature inside the building by one degree for one hour of the day.

Building properties, such as roofing, window placement, insulation and weather stripping can affect the need for heating/cooling as outdoor weather conditions change. For example, temperatures often drop below the building's base temperature at night (daily low temperature in diurnal variation), but because of insulation, heating may be unnecessary. Thus, even in varying weather conditions, well insulated buildings can better resist the need for heating (or cooling).

As discussed below, HDD/HDH (or CDD/CDH) information taken together with power consumption data, can be used to determine a proportion of energy consumption used for heating (or cooling), and thereby used to infer the effectiveness of building insulation. When further combined with detailed weather information, such as detailed temperature data, wind information, and/or solar exposure (solar insolation) information, specific building properties may be identified as majority contributors to heat loss (or heat gain). Accordingly, recommendations may be provided based on the types of weather fluctuations and corresponding changes in HDH/CDH score.

In some examples, detailed weather data can include information regarding changes to: temperature, wind speed, and/or solar insolation. In other aspects, a user's chosen thermostat setback, e.g., for a heating-ventilating air-conditioning unit (HVAC), may be used to determine the thermal sensitivity of the associated consumption location.

Thermal Sensitivity

In one aspect, temperature data for a region corresponding with an energy consumption location can be monitored, together with the overall energy use to determine a thermal sensitivity score. The thermal sensitivity score can be measured as a function of temperature difference values, i.e., HDD/HDH, or cooling degree days (CDD) or cooling degree hours (CDH) measurements. By way of example, a regression analysis can be used to determine a non-climate control coefficient and a climate control coefficient from heating-degree or cooling-degree information (e.g., represented as a series of temperature difference values), that are plotted against energy use values. As discussed in further detail with respect to FIG. 3B, below, the thermal sensitivity score can be based on a slope of a regression line that represents a respective heating/cooling coefficient.

Once calculated, the thermal sensitivity score provides a measure of sensitivity for energy consumption used for heating (or cooling) purposes, in relation to changes in outdoor temperature. In some instances, CDD/HDH variations due to changes in temperature are specifically isolated, e.g., to exclude energy demand changes resulting from other weather variables, such as wind speed or solar exposure.

The thermal sensitivity score can be used to determine a relative efficiency for a home or business, for example, based on a comparison with thermal sensitivity scores for other (sometimes similar) locations. In some aspects, the thermal sensitivity score may be used to infer energy efficiency based on a comparison of historic efficiency scores for the same property or consumption location. By way of example, highly efficient homes or businesses (i.e., well insulated consumption locations) may realize smaller fluctuations in energy use due to changes in outdoor temperature. As such, consumption locations with large thermal efficiency scores may be considered less energy efficient, as compared with locations where changes in energy demand are smaller.

Inferences regarding a building's thermal sensitivity can be particularly useful in helping to identify actionable changes to increase overall building efficiency. For example, a building that is particularly sensitive to outdoor temperature fluctuations may be in need of improved weather stripping, insulation (e.g., double pane windows) and/or other measures to reduce heat loss, or to retain cooler temperatures.

In some aspects, the thermal sensitivity score may be used, either alone or in conjunction with other types of sensitivity scores (e.g., a wind sensitivity score or solar sensitivity score—as discussed below), to generate and provide user notifications indicating actionable insights as to how the recipient may improve the energy efficiency of her home or business. For example, utility customers associated with a residence or business with poor thermal efficiency may be provided with recommendations regarding how to identify or eliminate thermal leaks and/or how to best utilize their HVAC system/s during periods when heating/cooling is desired.

Wind Sensitivity:

Similar to temperature, wind information for a location associated with energy consumption can be monitored, together with energy use to determine a wind sensitivity score. The wind sensitivity score can be determined based on a relationship between wind speed changes, and changes in energy demand at one or more consumption locations in the same region.

The wind sensitivity score can be calculated from energy use data and a series of corresponding outdoor wind speed values. In some aspects, a wind coefficient can be calculated by running a regression analysis on a series of wind speed values that are plotted against corresponding energy use values. As discussed in further detail below, wind speed values (or wind speed difference values) can be determined with respect to a baseline wind speed of, for example, 0 mph.

By providing an isolated measure of energy demand due to wind speed fluctuations, the wind sensitivity score can provide actionable insights for improving energy efficiency at a home/residence or business. For example, a high wind sensitivity score can indicate that an abnormal amount of heat loss is caused by wind-related causes, such as drafts, poor weather stripping, and/or faulty ventilation ducts, etc. Accordingly, targeted insights may be provided to customers with highly wind sensitive homes, including guidance regarding actions or steps that can be taken to reduce wind sensitivity and improve overall energy efficiency.

Solar Sensitivity

In another aspect, sun exposure information (solar insolation) for a location associated with energy consumption can be monitored, together with energy use, to determine a solar sensitivity score. In some aspects, the solar sensitivity score is based on a solar coefficient derived from a regression of solar insolation difference values and corresponding energy use data.

Similar to wind sensitivity and thermal sensitivity, isolating the effect of solar exposure (i.e., calculating a solar sensitivity score), can facilitate the generation of targeted user notifications, including actionable insights for reducing solar sensitivity and improving energy efficiency. By way of example, targeted notifications based on a solar sensitivity score could include recommendations for improving insulation (e.g., of a rooftop), adding reflective paint (e.g., silver paint), planting shade trees or bushes, or installing window shades/reflectors to reduce the incident light intensity on a user's residence or business.

Sun exposure information can include quantitative or qualitative measures of sun exposure. For example, sun exposure information may include solar insolation data, which indicates a measure of solar radiation energy received on a given surface area in a given time. Solar insolation may be expressed as average irradiance in watts per square meter (W/m2) or kilowatt-hours per square meter per day (kW·h/(m2·day)) (or hours/day). In other aspects, qualitative measures of sun intensity may be used, such as a ranking, e.g., 1 to 5, where '1' indicates cloudy weather and '5' indicates a sunny day.

FIG. 1 illustrates an example environment 100 for implementing one or more remote efficiency scoring systems. Environment 100 includes utility 102, configured for providing an energy resource (e.g., electric power) via power infrastructure 104. In the illustrated example, infrastructure 104 serves two geographic locations: first geographic location 106, and second geographic location 108; however, a greater or fewer number of geographic areas may be contemplated, without departing from the scope of the technology. As depicted, first geographic location 106 includes three consumption locations (e.g., businesses 106A, 106B, and 106C). Second geographic location 108 includes three home residence locations (e.g., 108A, 108B, and 108C).

Environment 100 further includes a communication network, i.e., network 112, which can represent a private network, a public network, and/or a network of networks, such as the Internet. Network 112 is configured to provide a communicative coupling between weather data service 116, utility 102, and one or more remote efficiency audit systems 114 (e.g., thermal sensitivity scoring system 114A, wind sensitivity scoring system 114B, and/or solar sensitivity scoring system 114C). Additionally, network 112 provides communication between a remote infrastructure metering (AMI) device 107, efficiency audit systems 114 and/or utility 102.

The elements of environment 100 are provided for the sake of describing various aspects of the technology. Additional (or fewer) systems may be arranged in a similar or different order, without departing from the scope of the technology. For example, various resource providers (in addition to utility 102), may be present, e.g., for providing additional or different consumable resources to one or more geographic areas. Additionally, efficiency audit systems 114, which are depicted as discreet systems in the example of FIG. 1, can be arranged in other configurations. For example, individual scoring systems 114A-C may be implemented in a single computing system, or in any number of discreet computing units and/or software modules, such as a distributed computing system or computing cluster.

It is understood that weather data service 116 can include a variety of physical sensors (e.g., weather sensors) located either proximate to, or geographically disparate from, one or more computing systems used to implement weather data service 116. By way of example, weather data service 116 can include one or more processing systems (e.g., servers/computer) configured to receive data from one or more other weather data providers and/or weather sensors. Additionally, weather data service 116 can include non-transitory storage media and a communications interface, e.g., for storing weather data signals, and transmitting weather data signals or other information to one or more of efficiency audit systems 114.

In the example of environment 100, utility 102 is configured to deliver a consumable resource (e.g., electric power, gas, water, etc.) to various consumption locations (e.g., business or residential buildings), in one or more geographic locations, such as first geographic region 106, and second geographic region 108. For illustrative purposes, various aspects of the subject technology described herein relate to electric and/or energy resources. Other consumable resources, however, are similarly contemplated. In some aspects, electric consumption information for each consumption location may be determined, either by utility 102 and/or using a smart metering device, such as AMI 107.

In practice, efficiency audit systems 114 are configured to receive weather data and energy consumption information buildings (resource consumption locations) in each geographic region. That is, efficiency audit systems 114 are configured to receive weather data (e.g., from weather data service 116), for each of the consumption locations in first geographic region 106, and second geographic region 108. Energy consumption information can be provided to audit systems 114, either by utility 102 (e.g., via network 112), and/or via one or more smart metering devices, such as AMI 107.

Once received by efficiency audit systems 114, weather and resource consumption data can be analyzed (e.g., using one or more sensitivity models), to determine an energy efficiency score for each of the consumption locations, e.g., business locations 106A-C, in first geographic region 106, and/or residential locations 108A-C, in second geographic region 108. The energy efficiency score can provide a relative measure of energy efficiency for each corresponding site.

It is understood that efficiency score calculations can be performed by energy audit systems 114 on a location-by-location basis, i.e., an efficiency score can be calculated for a single consumption location at a time. Alternatively, efficiency score calculations can be determined concurrently for one or more consumption locations in a geographic region, or for multiple geographic regions.

In some embodiments, energy efficiency scores are calculated based, at least in part, on the type of consumption location (e.g., the use type), size of the consumption location, and/or based on the geographic area and/or climate of the consumption location. In some aspects, the efficiency score may be a function of various sensitivity scores, for example, calculated by one or more of efficiency audit systems 114. That is, an energy efficiency score for a particular consumption location (such as home residence 108B) may be based on one or more of a thermal sensitivity score (calculated by thermal sensitivity scoring system 114A), a wind sensitivity score (calculated by wind sensitivity scoring system 114B), and/or a solar sensitivity score (calculated by solar sensitivity scoring system 114C).

In the example of environment 100, each of sensitivity scoring systems 114A-114C are configured to provide an efficiency score relative to a specific weather parameter. In turn, thermal sensitivity scoring system 114A is configured to provide a measure of energy efficiency for a consumption location that is based on changes/fluctuations in temperature conditions (i.e., a thermal sensitivity score). Wind sensitivity scoring system 114B is configured to provide a measure of energy efficiency for a consumption location based on changes in wind speed conditions (i.e., a win sensitivity score). Similarly, solar sensitivity scoring system 114C is configured to provide a measure of energy efficiency for a consumption location based on changes in solar exposure (sun light intensity), i.e., a solar sensitivity score.

As discussed in further detail below with respect to FIG. 2, each respective scoring system can be configured to calculate a sensitivity score for a particular weather parameter using one or more sensitivity models, which can be used to identify relationships between energy consumption and weather changes. By understanding the predominant drivers of heating/cooling activities, efficiency audit systems 114 can make personalized recommendations to help utility customers improve the energy efficiency of their home or business or enroll utility customers in specific utility programs aimed to help improve the customers' energy efficiency.

In one aspect, thermal sensitivity scoring system 114A can be used for scoring various consumption locations (e.g., assigning a thermal sensitivity score), based on a consumption location's ability to resist (indoor) temperature changes despite outdoor temperature fluctuations. As discussed in further detail below, thermal sensitivity scoring system 114A can implement a thermal sensitivity model to perform the scoring. By way of example, energy use information for a consumption site (e.g., consumption location 108A) is provided to scoring system 114A, together with temperature information provided by weather data service 116. Using the temperature information (e.g., for second geographic region 108) and resource consumption information for the consumption site, thermal sensitivity scoring system can determine an amount of power used by the consumption site that is attributable to heating or cooling activities, and resulting from outdoor temperature changes.

In some aspects, an amount of power consumed for heating/cooling that is due to a particular type of weather phenomena (e.g., temperature changes, wind speed, or solar insolation) determines a sensitivity score relating to that particular phenomena, such as, a thermal sensitivity score for outdoor temperature changes. However, in some aspects, two or more sensitivity scores (e.g., thermal sensitivity score, wind sensitivity score, and/or solar sensitivity score) may be used to calculate an overall (composite) efficiency score for a consumption location. As discussed in further detail below, sensitivity to changes in a particular weather parameter may be used to generate user notifications, providing targeted recommendations or suggestions for improving overall energy efficiency at the consumption location.

In another aspect, wind sensitivity scoring system 114B can be used for use scoring various consumption locations (e.g., one or more of 106A-106C and/or 108A-108C), based on the location's ability to resist indoor temperature change due to outdoor wind speed variations. Similar to, thermal sensitivity scoring system 114A, wind sensitivity scoring system 114B can implement a wind sensitivity model to perform scoring for various consumption locations. By way of example, energy use information for a consumption site (e.g., consumption location 108B) may be provided to wind sensitivity scoring system 114B, together with wind speed information, and/or temperature information, e.g., provided by weather data service 116.

Using the wind speed information for second geographic region 108 and resource consumption information for consumption site 108B, wind sensitivity scoring system can determine an amount of power used at the consumption site that is attributable to heating or cooling activities, and resulting from changes in wind speed.

In yet another aspect, solar sensitivity scoring system 114C can be used for scoring various consumption locations, based on energy expenditure for cooling activities that result from incident sunlight (e.g., indoor heating due to solar insolation). Similar to thermal and wind scoring systems 114A/B, solar sensitivity scoring system 114C can implement a solar sensitivity model to perform scoring for various consumption locations.

Sensitivity scoring for various weather parameters can be performed differently depending on the consumption location type (e.g., home or business) and/or based on the geographic location. For example, thermal sensitivity scoring in a geographic region with a typically temperate climate may be performed differently than for a different geographic region with extreme temperatures. Similarly, wind sensitivity scoring in a region with average wind speeds of around 15 mph may be performed differently from scoring performed in a region with average wind speeds of around 5 mph.

In some aspects, a higher sensitivity score for a particular weather phenomenon can indicate higher energy consumption sensitivity for that phenomenon. For example, if consumption location 108A were to receive the following sensitivity scores: Thermal—8; Wind—2; and Solar—4, it may indicate that energy expenditure at consumption location 108A was particularly sensitive to variations in outdoor temperature conditions. In another example, if consumption location 108B were to receive sensitivity scores: Thermal—4; Wind—9; and Solar—4, it may indicate that energy expenditure at consumption location 108B was relatively sensitive to high wind speeds. By way of further example, consumption location 106C may receive the following sensitivity scores: Thermal—2; Wind—5; and Solar—11; indicating that consumption location 106C is sensitive to changes in solar intensity.

However, it is understood that sensitivity score calculation can vary with implementation, for example, such that lower scores can correlate with greater amounts of weather sensitivity (e.g., temperature, wind and/or solar sensitivity, etc.).

Further to the above examples, sensitivity scores relating to a particular weather phenomenon can be used to generate targeted notifications to utility customers that may help them to improve energy efficiency at the consumption site. For example, a customer associated with consumption location 108A (with high thermal sensitivity), may be encouraged to make changes to reduce heat loss, such as, by making improvements to insulation, window panes or weather stripping. A customer associated with consumption location 108B (with high wind sensitivity), may be encouraged to make changes to reduce wind-related heat loss, such as, by reducing drafts, improved weather stripping, upgraded ventilation/ducting, etc. Similarly, a customer associated with consumption location 108C (with high solar sensitivity) may be encouraged to reduce the amount of incident light on her home, such as, by improving roofing materials, installing drapes/windows, and/or using reflective paint (e.g., white or silver colored paint) to reflect sunlight.

Sensitivity scoring for individual weather parameters may be used (e.g., by audit system 114) to calculate an overall energy efficiency score. Although the calculations used for determining an efficiency score can vary with implementation, in one example, a summation of sensitivity scoring may be used, wherein lower resulting scores can indicate a consumption location of greater efficiency. Further to the above example, consumption location 108A may have a total sensitivity or efficiency score of 14 (i.e., 8+2+4), whereas consumption location 108C may have a total sensitivity efficiency score of 18 (i.e., 2+5+11). It is understood that other algorithms or processing steps may be performed in the calculation of any individual sensitivity score, or in a composite efficiency score for a particular location. As discussed in further detail below, sensitivity calculations can include one or more normalization steps, e.g., for purposes of standardizing sensitivity scores as between various weather phenomena, and/or between different consumption sites.

Efficiency scoring can be used to identify more or less efficient consumption locations. For example, efficiency scores may be compared as between similar consumption locations e.g., for ranking purposes, or to provide comparison information to a utility customer. Wherein efficiency scores are normalized according to location, size and/or use-type, efficiency scores for various buildings (e.g., of different types/locations and/or sizes) may be compared directly. By way of example, normalization of efficiency scores and comparison between similar consumption locations allows consumption locations to be ranked based on their relative efficiency. In some instances, targeted user notifications may be provided to customers associated with consumption locations falling above (or below) an efficiency score threshold. In other instances, targeted notifications may be provided to the least efficient customers in a set, e.g., provided to customers associated with the three least efficient consumption locations, or least efficient consumption location amongst multiple compared consumption locations.

The selection of customers for receipt of a targeted notification can be based on an overall efficiency score, or on individual sensitivity scores for a specific weather parameter. For example, a predetermined threshold may be used to determine which customers will receive targeted notifications, wherein customers associated with consumption locations above a particular score are selected to receive targeted notifications. Further to the above examples, if a notification threshold were set at '16,' customers associated with consumption locations 108B and 108C (with respective efficiency scores of 17 and 18), would be selected as recipients of a targeted notification (e.g., providing tips or informational resources for making weather specific changes to their homes).

Figure 2:
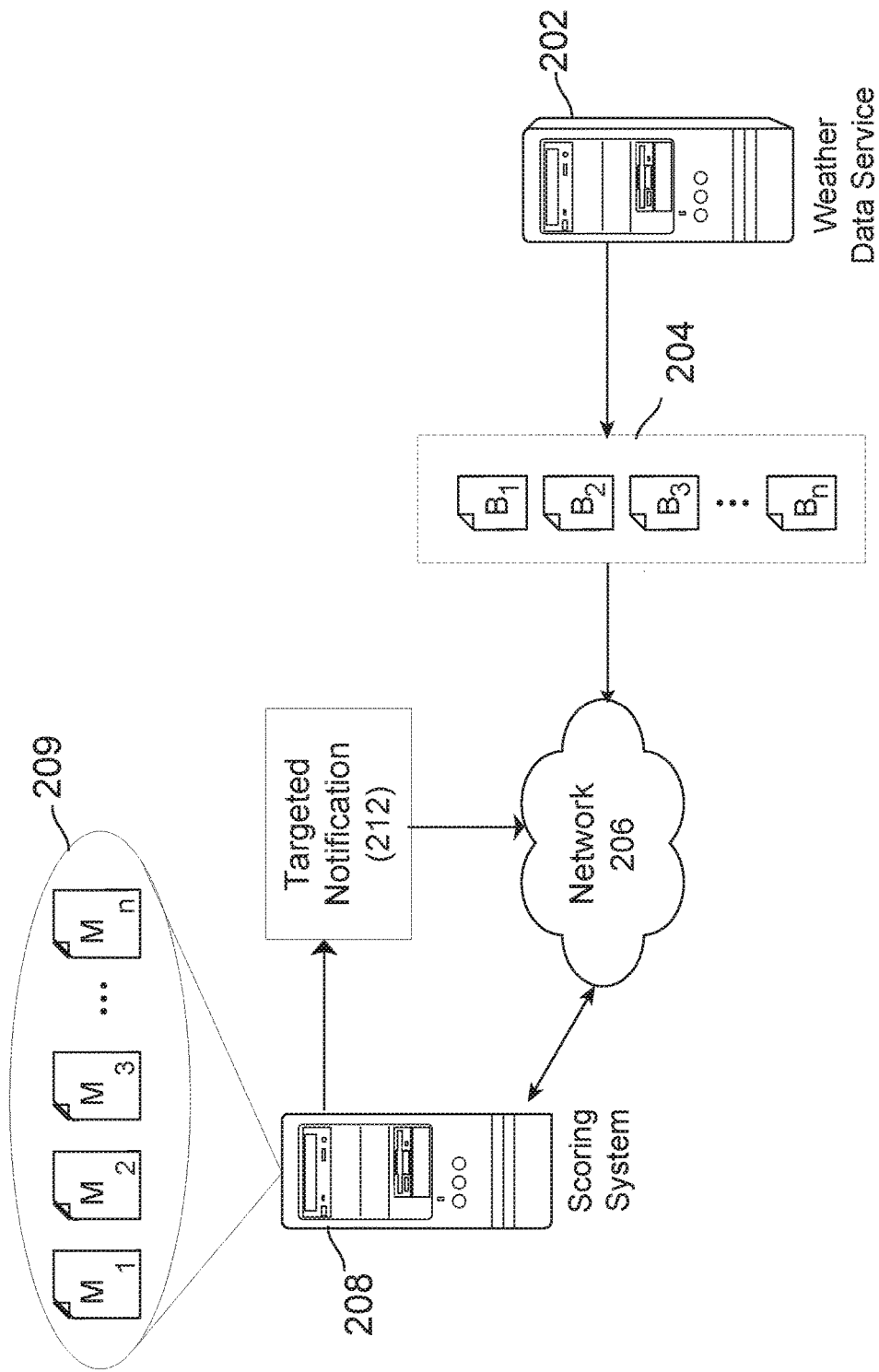
FIG. 2 illustrates an example environment for generating and/or updating one or more weather sensitivity models, according to some aspects of the technology.

FIG. 2 conceptually illustrates an example environment 200 for generating and/or updating one or more weather sensitivity models, such as a thermal sensitivity model, wind sensitivity model, and/or solar sensitivity model, as discussed with respect to FIG. 1. Environment 200 includes a weather data service 202 configured to provide weather parameter information 204 to scoring system 208, e.g., via network 206. Weather parameter information 204 can include data for various weather parameters (e.g., $B_1 \ldots B_n$), which represent individual weather measurements (e.g., temperature, wind speed, solar insolation values, etc.). Weather data service 202 may be a third-party provider, such as a public repository of weather information or a weather service. Alternatively weather data service may include a private or proprietary data service, including but not limited to weather or environmental information provided by one or more smart thermostat devices.

Scoring system 208 includes weather sensitivity models 209 (e.g., $M_1$-$M_n$), which can be used to analyze resource consumption information (e.g., electric energy usage) for a consumption location to determine a respective sensitivity score, as discussed with respect to FIG. 1. By way of example model $M_1$ can be used to analyze resource consumption information to determine a thermal sensitivity score; $M_2$ can be used to analyze resource consumption information to determine a wind sensitivity score; and $M_3$ can be used to analyze resource consumption information to determine a solar sensitivity score. Additionally, scoring system 208 may be used to generate a targeted notification 212, which can be provided to one or more customers via network 206.

In practice, scoring system 208 can also be used to generate weather sensitivity models 209. Generation of weather sensitivity models may be performed by applying regression techniques to a series of difference weather parameter difference values plotted against energy use data. As such, models 209 can represent regression models for relating weather parameters with resource consumption information.

By way of example, model $M_1$ can correspond with a thermal sensitivity model e.g., that includes a regression model relating resource consumption information with temperature variations. For example, using outdoor temperature values, a series of temperature difference values can be calculated, i.e., that are above (or below) a chosen baseline value (e.g., HDD/HDH or CDD/CHH values). As discussed above, baseline temperature values can be chosen as temperatures that are generally comfortable to humans (e.g., 70° F.). Once temperature difference values are plotted against energy use values, heating/cooling coefficients can be calculated using regression analysis (e.g., wherein the slope of a regression fit line corresponds with the cooling/heating coefficient), subsequently thermal sensitivity scores (e.g., heating and cooling sensitivity scores) can be calculated based on the cooling/heating coefficients.

$M_2$ can correspond with a wind sensitivity model, e.g., a regression model relating energy consumption information with wind speed variations. For example, a regression model of $M_2$ can be generated by correlating energy use values with outdoor wind speed values, (i.e., wind speed difference values above a baseline wind speed, such as 0 mph). By performing a regression analysis on the energy use values and wind speed values a wind coefficient can be calculated, for example, which corresponds with the slope of a fit line plotted between the wind speed values and energy use values. Subsequently, a wind sensitivity score can be calculated based on the wind coefficient, i.e., by performing one or more normalization steps.

In a similar manner, $M_3$ can correspond with a solar sensitivity model, e.g., a regression model relating energy consumption information with insolation data. For example, a regression model of $M_3$ can be generated by correlating energy use values with outdoor solar insolation values, (i.e., solar insolation difference values above a baseline solar insolation, such as 0). By performing a regression analysis on the energy use values and the solar insolation difference values a solar coefficient can be calculated, for example, which corresponds with the slope of a fit line plotted between the solar insolation values and energy use values. Subsequently, a solar sensitivity score can be calculated based on the solar coefficient, i.e., by performing one or more normalization steps.

Although regression models are illustrated by the foregoing examples, it is understood that models $M_1$-$M_n$ can include other types of mathematical models or relationships, without departing from the scope of the technology. For example, $M_1$-$M_n$ can include machine-learning implementations, such as classification models that are trained using sets of example data (i.e., "training sets"). Still further, models $M_1$-$M_n$ may include graphs, equations, or other relationships.

Figure 3A:
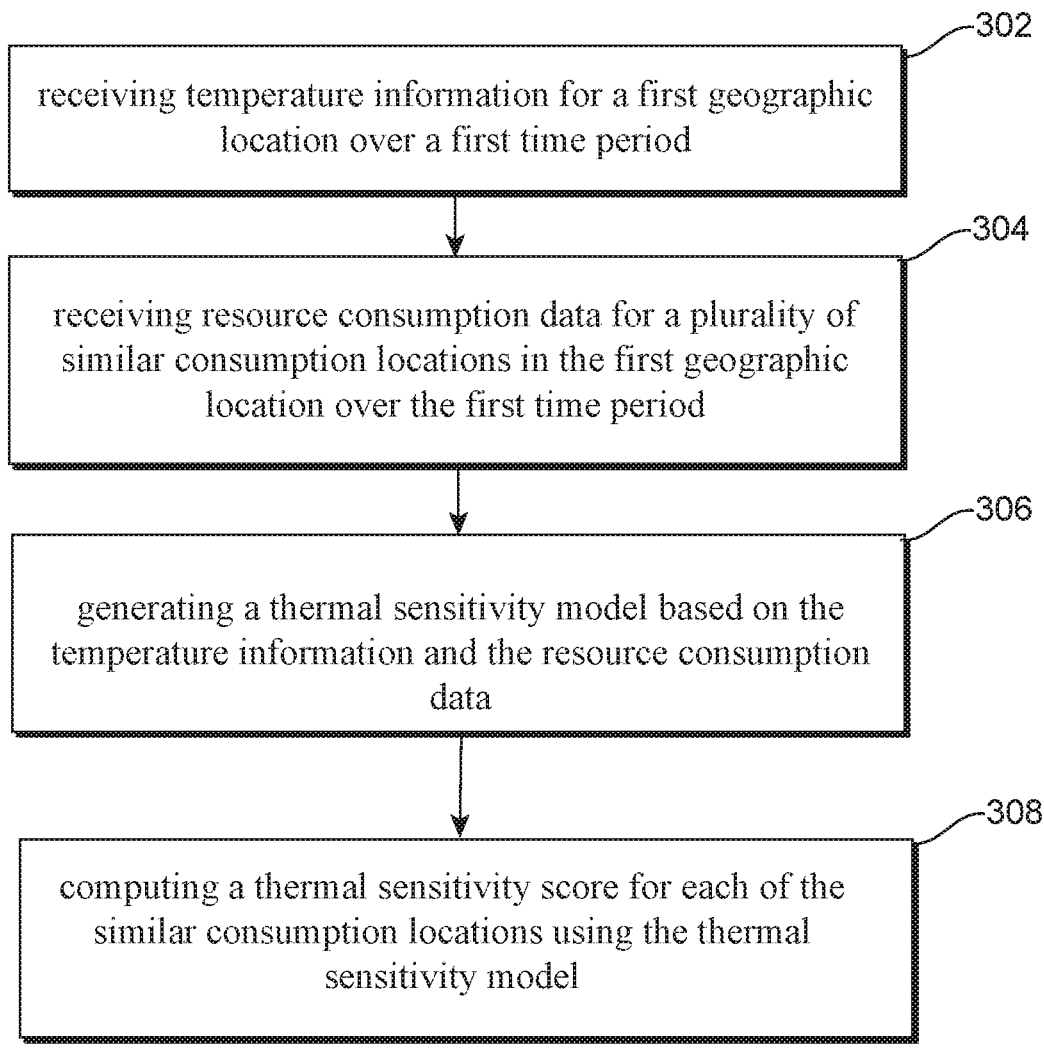
FIG. 3A illustrates a flow diagram of an example process for using a thermal sensitivity model to provide targeted notifications to a resource consumer.

FIG. 3A illustrates a flow diagram of an example process 300 for implementing a thermal sensitivity model. Process 300 begins with step 302 in which weather information (i.e., temperature data) is received by a scoring system, such as thermal sensitivity scoring system 114A, discussed above. Received temperature information can include data for various geographic locations and/or measurements recorded on different time scales. For example, temperature information may include temperature measurements taken on a daily, hourly or minute-by-minute basis for one or more geographic locations.

In step 304, resource consumption information for one or more consumption locations is received by the scoring system. Although resource consumption information can be received for a single consumption location (e.g., for a sensitivity calculation pertaining to just that location), in some implementations, resource consumption information may be received for multiple consumption locations (e.g., for multiple respective sensitivity score calculations that may be calculated for comparison purposes).

In instances where resource consumption information is collected for multiple consumption locations, data collection may be segmented to collect resource consumption data for similar consumption locations, e.g., that share similar features or characteristics. Building similarities can be based on a variety of qualities, including but not limited to: geographic location, size (e.g., square footage, and/or building height), use-type (e.g., business or residential, business type, etc.), or occupancy number, etc. In this manner, resource consumption amounts for similar buildings situated in similar weather conditions (e.g., a common geographic location) can be analyzed and compared.

In step 306, a thermal sensitivity model is generated based on the temperature information and resource consumption data. As discussed above, the thermal sensitivity model can be based on a regression derived coefficient using a series of temperature difference values (e.g., CDD/HDD or CDH/HDH values) to determine a correlation with energy use. By way of example, energy use data for a consumption location can be received with corresponding outdoor temperature values. Using the outdoor temperature values, a series of temperature difference values (e.g., cooling degree values or heating degree values) can be calculated with respect to a chosen baseline temperature. Subsequently, heating/cooling coefficients can be calculated by performing a regression analysis (e.g., least squares) on the energy use values and corresponding temperature difference values. The slope of the resulting fit line represents heating/cooling coefficient/s that can subsequently be used to generate a thermal sensitivity score (as discussed in step 308, below). It is understood that other types of regression analysis may be used, such as non-linear regression, piece-wise regression, etc.), without departing from the scope of the technology.

Subsequently, in step 308, a thermal sensitivity score is computed (e.g., for each of the consumption locations) using the thermal sensitivity model generated in step 306. In particular, the thermal sensitivity score can be based on the heating/cooling coefficient for a particular consumption location. In some aspects, one or more normalization steps may be performed to the heating/cooling coefficient, e.g., to produce a numeric score that may be compared with other efficiency score types, as discussed in further detail below. Thermal sensitivity score normalization can also facilitate comparison of sensitivity scores in implementations wherein sensitivity scores are to be compared as between different consumption locations. The calculated thermal sensitivity score provides a relative indication of energy use predicted by fluctuations to outdoor temperatures, for example, while isolating other weather variables such as wind speed, solar exposure and/or humidity, etc.

Further to the above examples, the thermal sensitivity score for any particular consumption location may be used alone, or in conjunction with other sensitivity score types, e.g., to drive targeted customer notifications. By way of example, a customer at a consumption location with a relatively high thermal sensitivity score may be provided with tips or informational resources for reducing heat loss (or heat gain) due to drops (or increases) in outdoor temperature.

Figure 3B:
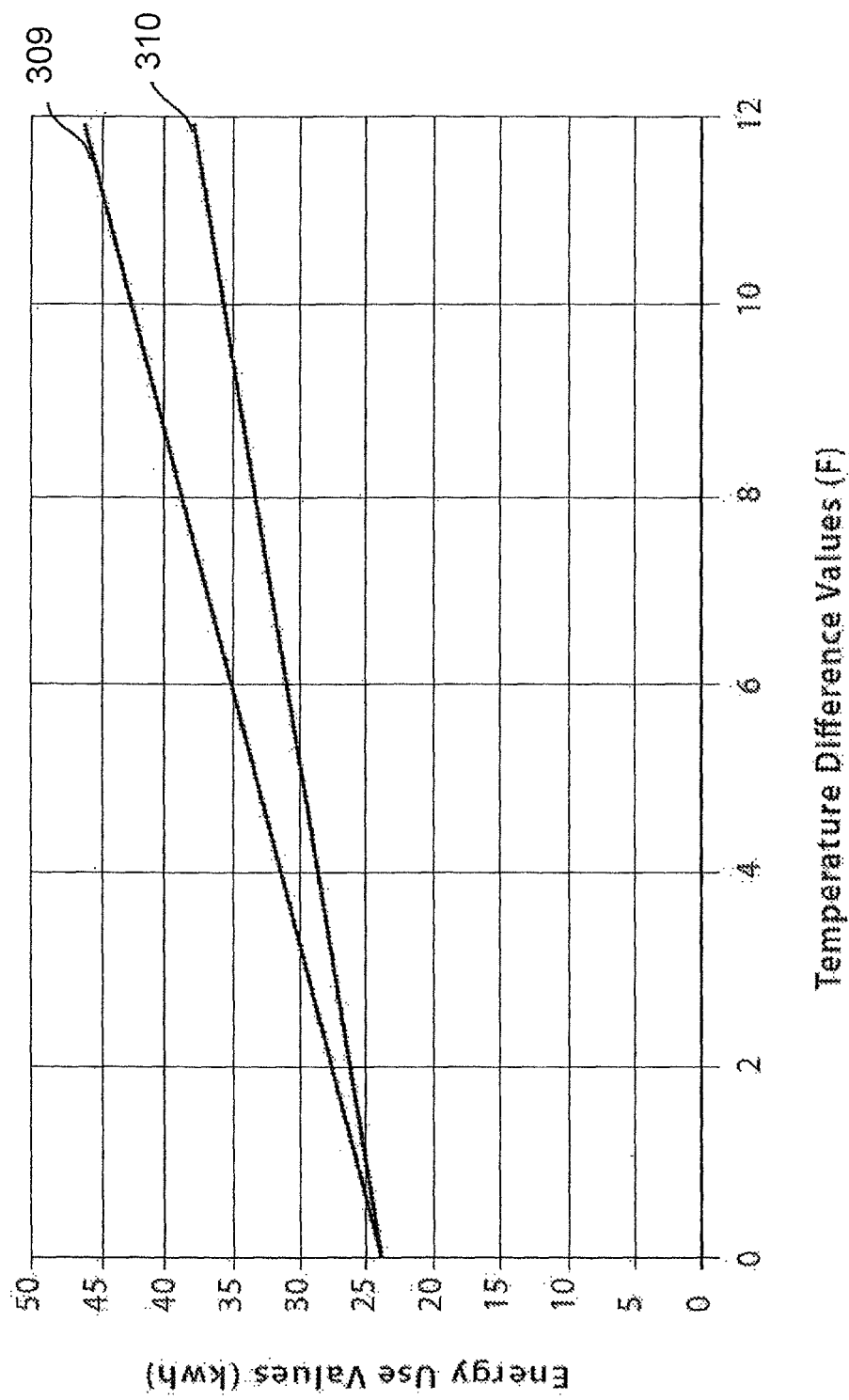
FIG. 3B illustrates a graphical example of a plot of temperature difference values and corresponding energy use values for two different consumption locations.

FIG. 3B illustrates a graphical example of a plot of temperature difference values and corresponding energy use values for two different consumption locations (e.g., 309 and 310). As discussed above, the slope of each respective regression line can represent a heating (or cooling) coefficient for the respective location. In turn, corresponding thermal sensitivity scores can be based on the heating/cooling coefficient for the respective location.

Figure 4:
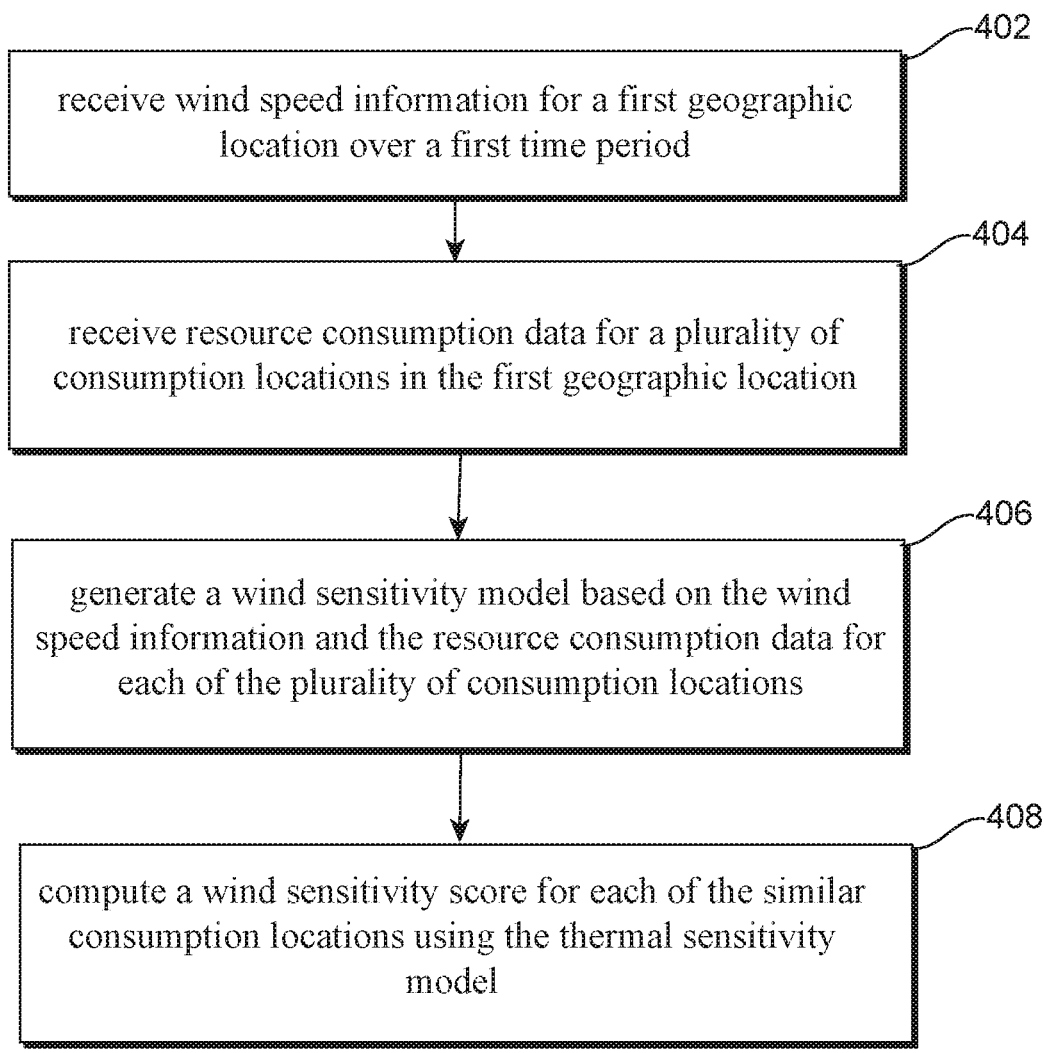
FIG. 4 illustrates a flow diagram of an example process for using a wind speed sensitivity model to provide targeted notifications to a resource consumer.

FIG. 4 illustrates a flow diagram of an example process 400 for using a wind speed sensitivity model to provide targeted notifications to a resource consumer. Process 400 begins with step 402 in which wind speed information is received by a scoring system, such as wind sensitivity scoring system 114B, discussed above. Wind information may be received together with other weather quality metrics, such as humidity, temperature, and/or solar exposure, etc. In some aspects, wind information can include wind speed data and/or wind direction data for one or more geographic locations and/or measurements recorded on different time scales. For example, wind information may include measurements taken on a daily, hourly or minute-by-minute basis.

In some aspects, wind speed information may be processed with respect to a baseline wind speed, e.g., to produce wind speed difference values. The baseline wind speed may be one that is user defined, and can be based on average common or average wind speeds for the associated area. By way of example, a baseline wind speed may be 0 mph.

In step 404, resource consumption information for one or more consumption locations is received by the scoring system. Although resource consumption information can be received for a single consumption location (e.g., for a wind sensitivity calculation pertaining to just that location), in some implementations, resource consumption information may be received for multiple consumption locations (e.g., for multiple respective sensitivity score calculations that may be calculated for comparison purposes).

In instances wherein consumption information is received for multiple consumption locations, similar consumption locations may be chosen such that comparisons amongst different locations may be more easily made. By way of example, building similarities can be based on a variety of qualities or characteristics, including but not limited to: geographic location, size (e.g., square footage, and/or building height), use-type, or occupancy number, etc. In this manner, resource consumption amounts for similar buildings situated in similar weather conditions (e.g., a common geographic location) may be analyzed and compared.

In step 406, a wind model is generated based on the wind speed information and resource consumption data. By way of example, energy use data for a consumption location can be received with a series of corresponding wind speed difference values. Subsequently, a wind coefficient can be calculated by performing a regression analysis (e.g., least squares) on the energy use values and wind speed difference values. The slope of the resulting fit line represents a wind coefficient that can be used to generate a wind sensitivity score (discussed further in step 408, below). It is understood that other types of regression analysis may be used, such as non-linear regression, piece-wise regression, etc.), without departing from the scope of the technology.

In step 408, a wind sensitivity score is computed (e.g., for one or more consumption locations) using the wind sensitivity model of step 406. In particular, each wind sensitivity score can be based on the wind coefficient for a corresponding consumption location. In some aspects, one or more normalization steps may be performed on the wind coefficient, e.g., to produce a numeric score that can be compared with other efficiency score types. Sensitivity score normalization can also facilitate comparison of scores in implementations wherein sensitivity scores are to be compared as between different locations.

In some aspects, the wind sensitivity score can be used to drive targeted notifications to utility customers. For example, if a wind sensitive consumption location (e.g., with a high wind sensitivity score), is not thermally sensitive (low thermal sensitivity score), then building may have issues with ventilation or drafts. As such, customers associated with wind sensitive homes (or businesses) can be provided with tips and/or information resources regarding ways to fix common draft problems, such as, by upgrading ventilation ducts, or replacing weather stripping, etc.

Figure 5:
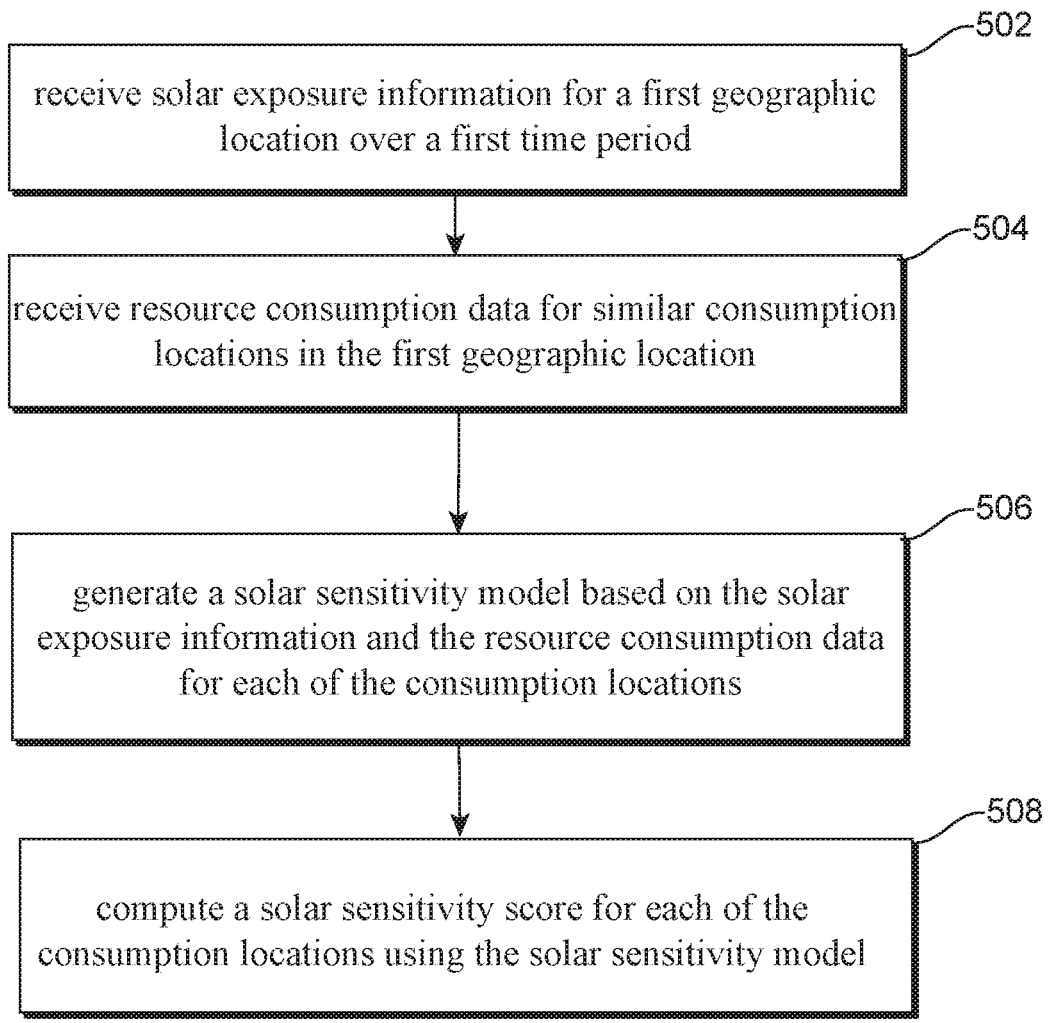
FIG. 5 illustrates a flow diagram of an example process for using a solar sensitivity model to provide targeted notifications to a resource consumer.

FIG. 5 illustrates a flow diagram of an example process 500 for using a solar sensitivity model to provide targeted notifications to a resource consumer. Process 500 begins with step 502, in which solar exposure information (e.g., solar insolation data) is received by a scoring system, such as solar sensitivity scoring system 114C.

Solar exposure information may be received together with other weather quality metrics, such as humidity, temperature, and/or solar exposure, etc. Solar exposure information can include weather data for various geographic locations and/or measurements recorded on different time scales, such as measurements taken on a daily, hourly or minute-by-minute basis. In some aspects, solar exposure data may be received in various forms, such as qualitative measures of cloud coverage or a UV index.

In step 504, resource consumption information (energy use values) for one or more consumption locations is received by the scoring system. Although resource consumption information can be received for a single consumption location (e.g., for a solar sensitivity calculation pertaining to just that location), in some implementations, resource consumption information may be received for multiple consumption locations (e.g., for multiple respective sensitivity score calculations for comparison purposes).

In instances wherein consumption information is received for multiple consumption locations, similar consumption locations may be chosen such that comparisons amongst different locations may be more easily made. By way of example, building similarities can be based on a variety of qualities or characteristics, including but not limited to: geographic location, size (e.g., square footage, and/or building height), use-type, or occupancy number, etc. In this manner, resource consumption amounts for similar buildings situated in similar weather conditions (e.g., a common geographic location) may be analyzed and compared.

In step 506, a solar sensitivity model is generated based on the solar insolation information and resource consumption data. By way of example, energy use data for a consumption location can be received with a series of corresponding solar insolation difference values. Subsequently, a solar coefficient can be calculated by performing a regression analysis (e.g., least squares) on the energy use values and solar insolation difference values. The slope of the resulting fit line represents a solar coefficient that can be used to generate a solar sensitivity score (discussed further in step 508, below).

Subsequently, in step 508, a solar sensitivity score is computed e.g., for each of the consumption locations, using the solar sensitivity model of step 506. More specifically, the resource consumption data and solar exposure information are analyzed to determine a solar sensitivity score for each consumption location. As discussed above, the solar sensitivity score provides a relative indication of energy use predicted by fluctuations in sunlight intensity on or around the consumption location. Similar to the above discussed sensitivity calculations systems for temperature and wind speed, the solar sensitivity score can be calculated while isolating other weather variables such as wind speed, temperature and/or humidity, etc.

The solar sensitivity score can be used to drive targeted notifications in instances where a consumption location is greatly affected by an amount of incident sunlight (sun insolation). By way of example, a targeted notification may include advice or information resources for reducing the heating effect of intense sunlight, such as, the installation of blinds or black out curtains, reflective roofing and/or the use of reflective paints or other surfaces, etc.

Figure 6:
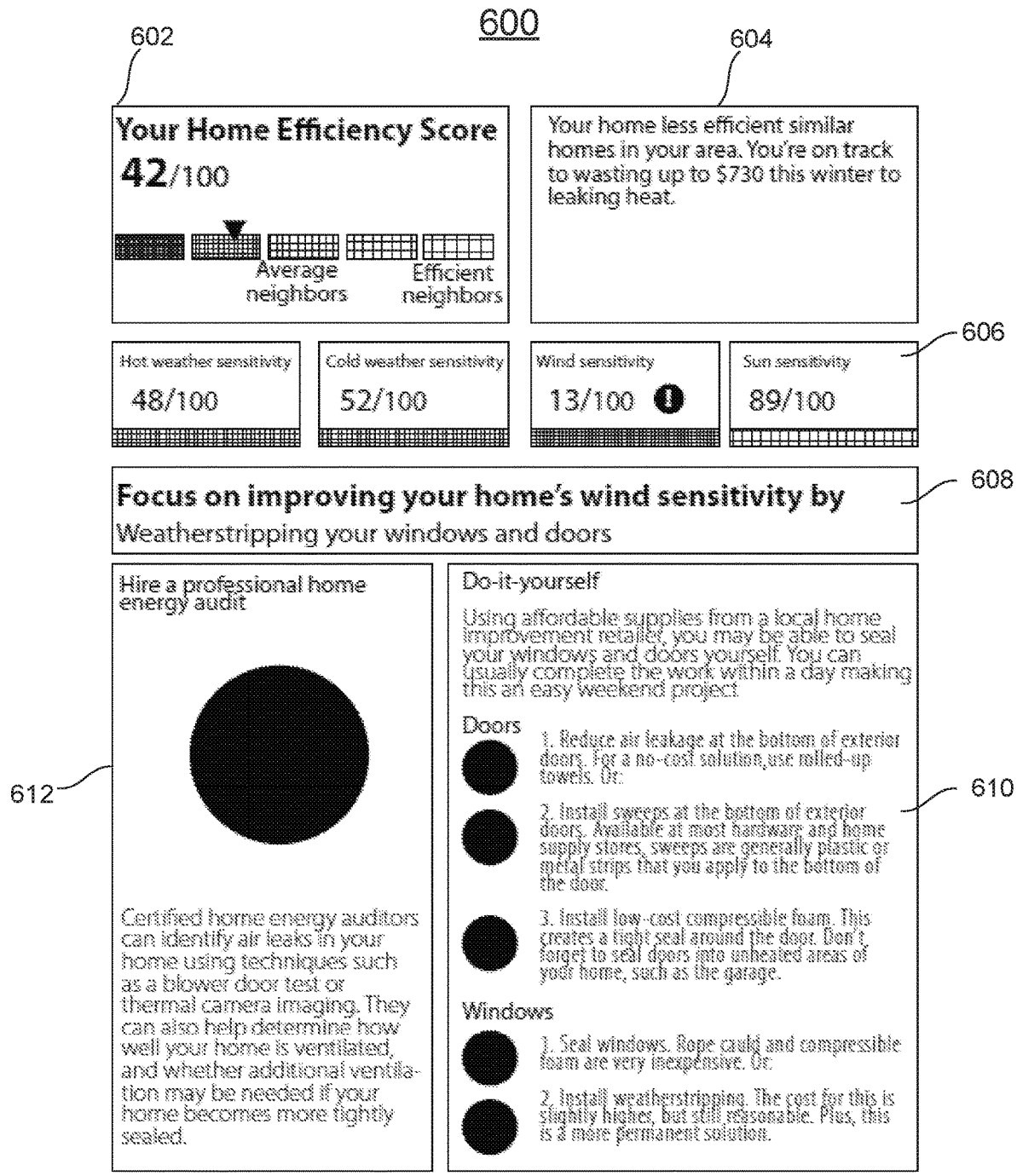
FIG. 6 illustrates an example of a targeted user notification that is generated based on one or more sensitivity score calculations, according to some aspects of the technology.

FIG. 6 illustrates an example of a targeted notification 600 that is generated based on one or more sensitivity score calculations for a given consumption location. As illustrated in the example of FIG. 6, targeted notification 600 can include an efficiency score indication 602 that provides an overall/composite efficiency measure of the location. Efficiency score indication 602 can also provide information regarding a relative rank or energy efficiency rating with respect to other consumption locations, such as neighboring buildings/residences.

Targeted user notification 600 can also include individual weather efficiency score indicators 606, which can include one or more of: a hot weather sensitivity indicator, a cold weather sensitivity indicator, a wind sensitivity indicator, and/or a sun sensitivity indicator. As additionally illustrated, Targeted user notification 600 can further include customer recommendation information (608, 610, and/or 612), which provide either recommendations for user actions that may be taken to improve building efficiency, additional aspects that may be taken into consideration to improve efficiency, and/or recommendations to pursue professional guidance to further home or building improvements.

Figure 7:
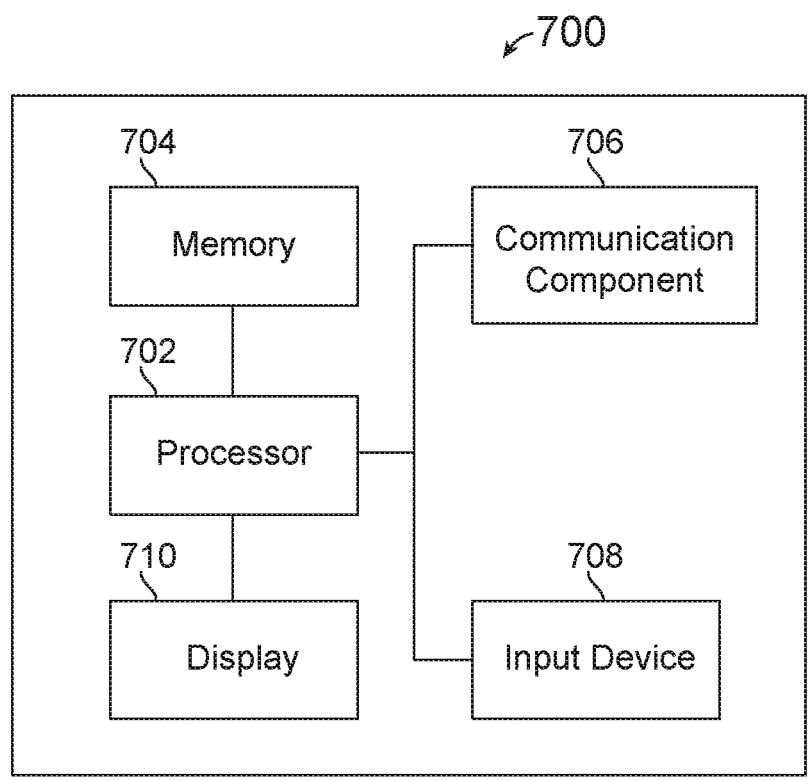
FIG. 7 illustrates an example electronic system with which some aspects of the subject technology can be implemented.

FIG. 7 illustrates an example configuration of components of a computing device 700, according to certain aspects of the subject technology. In this example, the computing device 700 includes a processor 702 for executing instructions that can be stored in a memory device or element 704. The instructions may cause the computing device 700 to execute computer-implemented methods and/or receive instructions. Computing device 700 may be implemented as a sensitivity scoring system, an audit system, and/or for generating and dispatching targeted user notifications. By way of example, processor 702 can be configured to perform operations including: receiving, wind information for a first geographic location over a first time period, receiving resource consumption data for each of a plurality of similar consumption locations in the first geographic location over the first time period, generating, by the processors, a wind sensitivity model based on the wind information and the resource consumption data for each of the plurality of similar consumption locations, and computing, by the processors, a wind sensitivity score for each of the similar consumption locations using the wind sensitivity model, wherein each of the wind sensitivity scores indicates a relative energy use sensitivity for a corresponding consumption location relative to wind speed fluctuations in the first geographic location.

As would be apparent to one of ordinary skill in the art, computing device 700 can include many types of memory, data storage, or non-transitory computer-readable storage media, such as a first data storage for program instructions for execution by processor 702, a separate storage for usage history or user information, a removable memory for sharing information with other devices, etc. Computing device 700 can include one or more communication components 706, such as a Wi-Fi, Bluetooth®, radio frequency, near-field communication, wired or wireless communication system. The computing device 700 in many embodiments can communicate with a network, such as the Internet, and may be able to communicate with other such devices.

As discussed, the computing device 700 in many embodiments will include at least one input element 708 able to receive input from a user. This input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The computing device 700 includes some type of display element 710, such as a touch screen or liquid crystal display (LCD).

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, comprising:
   receiving, by one or more processors, temperature information for a first geographic location over a first time period;
   receiving, by the processors, resource consumption data for each of a plurality of consumption locations in the first geographic location over the first time period;
   generating, by the processors, a thermal sensitivity model based on the temperature information and the resource consumption data for each of the plurality of consumption locations;
   computing, by the processors, a thermal sensitivity score for each of the consumption locations using the thermal sensitivity model, wherein each of the thermal sensitivity scores indicates a relative energy use sensitivity for a corresponding consumption location relative to temperature fluctuations in the first geographic location;
   comparing the thermal sensitivity scores from each of the plurality of consumption locations and ranking the plurality of consumption locations based at least on the thermal sensitivity scores;
   identifying, by the processors, a target consumption location, from among the plurality of consumption locations, wherein identifying the target consumption location further comprises:
      calculating a wind sensitivity score for each of the plurality of consumption locations using a wind sensitivity model, wherein each of the wind sensitivity scores indicates a relative energy use sensitivity for a corresponding consumption location relative to wind speed fluctuations in the first geographic location;
      calculating a solar sensitivity score for each of the plurality of consumption locations using a solar sensitivity model, wherein each of the solar sensitivity scores indicates a relative energy use sensitivity for a corresponding consumption location relative to sun light intensity fluctuations in the first geographic location; and
      identifying the target consumption location based on one or more of: the thermal sensitivity score, the wind sensitivity score, and the solar sensitivity score;
   wherein the target consumption location is identified as at least one location that is a least efficient consumption location from among the consumption locations based on the ranking of the thermal sensitivity scores;
   generating, by the processors, a targeted notification for a utility customer associated with the target consumption location identified from the plurality of consumption locations, wherein the targeted notification comprises one or more energy efficiency tips that (i) are selected based on two or more of the thermal sensitivity score, the wind sensitivity score, or the solar sensitivity score associated with the target consumption location, and (ii) include instructions for identifying and eliminating thermal leaks in a structure; and
   transmitting, by the processors, the targeted notification to a device associated with the target consumption location.

2. The computer-implemented method of claim 1, wherein generating the thermal sensitivity model further comprises:

computing a regression model using the temperature information for the first geographic location and the resource consumption data for each of the consumption locations.

3. The computer-implemented method of claim 1, wherein generating the thermal sensitivity model further comprises:
processing the temperature information and the resource consumption data to calculate a cooling coefficient.

4. The computer-implemented method of claim 1, wherein generating the thermal sensitivity model further comprises:
processing the temperature information and the resource consumption data to calculate a heating coefficient.

5. The computer-implemented method of claim 1, wherein computing the thermal sensitivity score, further comprises:
determining one or more temperature difference values using the temperature information for the first geographic location; and
calculating a cooling coefficient using the resource consumption data and the one or more temperature difference values.

6. The computer-implemented method of claim 1, wherein the resource consumption data comprises one or more of: electric energy consumption data, natural gas consumption data, or water use data.

7. The computer-implemented method of claim 1, wherein at least two of the consumption locations are selected based on geographic location, square footage, or building height.

8. A computer-implemented method, comprising:
receiving, by one or more processors, two or more of temperature information, wind speed information, and solar exposure information for a first geographic location over a first time period;
receiving, by the processors, resource consumption data for each of a plurality of consumption locations in the first geographic location over the first time period;
generating, by the processors, two or more models selected from: (i) a thermal sensitivity model based on the temperature information and the resource consumption data for each of the plurality of consumption locations, (ii) a wind sensitivity model based on the wind speed information and the resource consumption data for each of the plurality of sir consumption locations, and (iii) a solar sensitivity model based on the solar exposure information and the resource consumption data for each of the plurality of consumption locations;
computing, by the processors, two or more sensitivity scores corresponding to the selected models, comprising:
(i) a thermal sensitivity score for each of the consumption locations using the thermal sensitivity model, wherein each of the thermal sensitivity scores indicates a relative energy use sensitivity for a corresponding consumption location relative to temperature fluctuations in the first geographic location;
(ii) a wind sensitivity score for each of the consumption locations using the wind sensitivity model, wherein each of the wind sensitivity scores indicates a relative energy use sensitivity for a corresponding consumption location relative to wind speed fluctuations in the first geographic location; and
(iii) a solar sensitivity score for each of the consumption locations using the solar sensitivity model,
wherein each of the solar sensitivity scores indicates a relative energy use sensitivity for a corresponding consumption location relative to sun light intensity fluctuations in the first geographic location;
identifying, by the processors, a target consumption location, from among the plurality of consumption locations, based on the two or more sensitivity scores for the target consumption location;
wherein the target consumption location is identified as at least one location that is a least efficient consumption location from among the consumption locations based on the two or more sensitivity scores;
generating, by the processors, a targeted notification for a utility customer associated with the target consumption location identified from the plurality of consumption locations, wherein the targeted notification comprises one or more energy efficiency tips that (i) are selected based on the two or more sensitivity scores associated with the target consumption location, and (ii) include instructions for identifying and eliminating thermal leaks in a structure; and
transmitting, by the processors, the targeted notification to a device associated with the target consumption location.

9. The system of claim 8, wherein computing the thermal sensitivity score further comprises:
generating, by the processors, the thermal sensitivity model based on the temperature information and the resource consumption data.

10. The system of claim 9, wherein generating the thermal sensitivity model further comprises:
computing a regression model using the temperature information for the first geographic location and electric energy consumption data for each of a plurality of consumption locations in the first geographic location.

11. The system of claim 8, wherein the thermal sensitivity score indicates a relative energy use sensitivity for the consumption location relative to temperature fluctuations in the first geographic location.

12. The system of claim 8, wherein the resource consumption data comprises one or more of: electric energy consumption data, natural gas consumption data, or water use data.

13. A non-transitory computer-readable storage medium comprising instructions stored therein, which when executed by one or more processors, cause the processors to perform operations comprising:
receiving, by one or more processors, two or more of temperature information, wind speed information, and solar exposure information for a first geographic location over a first time period;
receiving, by the processors, resource consumption data for each of a plurality of consumption locations in the first geographic location over the first time period;
generating, by the processors, two or more models selected from: (i) a thermal sensitivity model based on the temperature information and the resource consumption data for each of the plurality of consumption locations, (ii) a wind sensitivity model based on the wind speed information and the resource consumption data for each of the plurality of consumption locations, and (iii) a solar sensitivity model based on the solar exposure information and the resource consumption data for each of the plurality of consumption locations;
computing, by the processors, two or more sensitivity scores corresponding to the selected models, comprising:

(i) a thermal sensitivity score for each of the consumption locations using the thermal sensitivity model, wherein each of the thermal sensitivity scores indicates a relative energy use sensitivity for a corresponding consumption location relative to temperature fluctuations in the first geographic location;
(ii) a wind sensitivity score for each of the consumption locations using the wind sensitivity model, wherein each of the wind sensitivity scores indicates a relative energy use sensitivity for a corresponding consumption location relative to wind speed fluctuations in the first geographic location; and
(iii) a solar sensitivity score for each of the consumption locations using the solar sensitivity model, wherein each of the solar sensitivity scores indicates a relative energy use sensitivity for a corresponding consumption location relative to sun light intensity fluctuations in the first geographic location;

identifying, by the processors, a group of target consumption locations, from among the plurality of consumption locations, based on the two or more sensitivity scores for the target consumption location;

wherein the group of target consumption locations is identified from a number of locations that are least efficient consumption locations from among the consumption locations based on the two or more sensitivity scores;

generating, by the processors, a targeted notification for utility customers associated with the group of target consumption locations, wherein the targeted notification comprises one or more energy efficiency tips that (i) are selected based on the two or more sensitivity scores associated with the target consumption location, and (ii) include instructions for identifying and eliminating thermal leaks in a structure; and controlling transmission of the targeted notification, based on at least the group of target consumption locations, to cause the targeted notification to be transmitted to devices associated with the utility customers of the group of targeted consumption locations to cause changes to the structure to reduce energy loss.

14. The non-transitory computer-readable storage medium of claim 13, wherein the instructions are further configured to cause the processors to perform operations comprising:
computing a regression model using the temperature information for the first geographic location and the resource consumption data for each of the consumption locations.

15. The non-transitory computer-readable storage medium of claim 13, wherein the instructions are further configured to cause the processors to perform operations comprising:
processing the temperature information and the resource consumption data to calculate a cooling coefficient.

16. The non-transitory computer-readable storage medium of claim 13, wherein the instructions are further configured to cause the processors to perform operations comprising:
comparing the two or more sensitivity scores from each of the plurality of consumption locations and ranking the plurality of consumption locations based at least on the two or more sensitivity scores; and
wherein the group of target consumption locations is identified from a number of locations that are least efficient consumption locations from among the consumption locations based on the ranking of the two or more sensitivity scores.

* * * * *